(12) United States Patent
Fardig et al.

(10) Patent No.: US 10,897,599 B1
(45) Date of Patent: Jan. 19, 2021

(54) FACILITATION OF VIDEO CONFERENCE BASED ON BYTES SENT AND RECEIVED

(71) Applicant: Lenovo (Singapore) Pte. Ltd., Singapore (SG)

(72) Inventors: Matthew Fardig, Boonville, IN (US); Lindsay Nelson, Highlands Ranch, CO (US); Sarah Kleinman, Boulder, CO (US); Shawn Sharp, Buhl, ID (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 16/793,537

(22) Filed: Feb. 18, 2020

(51) Int. Cl.
*H04N 7/15* (2006.01)
*H04N 7/14* (2006.01)
*H04L 12/26* (2006.01)

(52) U.S. Cl.
CPC ......... *H04N 7/152* (2013.01); *H04L 43/0847* (2013.01); *H04N 7/147* (2013.01)

(58) Field of Classification Search
USPC ................................. 348/14.01, 14.02, 14.08
See application file for complete search history.

(56) References Cited

U.S. PATENT DOCUMENTS

| | | | |
|---|---|---|---|
| 9,553,780 B1* | 1/2017 | Bullukian | H04L 43/50 |
| 2015/0092013 A1* | 4/2015 | Noisette | H04N 7/152 |
| | | | 348/14.09 |
| 2016/0072862 A1* | 3/2016 | Bader-Natal | G06F 3/0482 |
| | | | 715/755 |
| 2016/0330253 A1* | 11/2016 | Inoue | H04M 1/72522 |
| 2017/0149861 A1* | 5/2017 | Good | H04L 69/324 |

* cited by examiner

*Primary Examiner* — Maria El-Zoobi
(74) *Attorney, Agent, or Firm* — John L. Rogitz

(57) ABSTRACT

In one aspect, an apparatus may include at least one processor and storage accessible to the at least one processor. The storage may include instructions executable by the at least one processor to compare a first number of bytes sent from a first device as part of a video conference to a second number of bytes received at a second device as part of the video conference, where the first and second number of bytes may both pertain to a same portion of the video conference. The instructions may also be executable to, responsive to the first number of bytes not matching the second number of bytes to within a threshold, take one or more actions to assist in mitigating future loss of bytes for the video conference.

20 Claims, 5 Drawing Sheets

600

```
         SETTINGS

■ ENABLE CONFERENCE MONITORING AND ADDRESS BYTE LOSS ~602

■ TAKE ACTION AUTOMATICALLY ~604
   ■ TELL ME WHAT TO DO ~606
```

FIG. 6

FACILITATION OF VIDEO CONFERENCE BASED ON BYTES SENT AND RECEIVED

FIELD

The present application relates to technically inventive, non-routine solutions that are necessarily rooted in computer technology and that produce concrete technical improvements.

BACKGROUND

There are a number of video conferencing tools currently on the market. As recognized herein, however, if network errors occur these tools do not adequately notify one conference participant as to whether other participants can actually see the first participant's video feed, see the first participant's display screen if a screen is being shared, or hear the first participant's audio. At best, the first participant might be able to see/hear their own local feed of what they think they are sharing without receiving confirmation that the other participants are actually receiving the feed. There are currently no adequate solutions to the foregoing computer-related, technological problem that specifically arises in the realm of computer networks.

SUMMARY

Accordingly, in one aspect a first device includes at least one processor and storage accessible to the at least one processor. The storage includes instructions executable by the at least one processor to receive one or more bytes of data from a second device as part of a video conference and to determine, based on the one or more bytes of data from the second device, a first number of bytes being received during a particular time increment. The instructions are also executable to receive metadata regarding a second number of bytes that are to be received during the particular time increment, compare the first number of bytes to the second number of bytes, and take one or more actions to facilitate the video conference responsive to the first number of bytes and the second number of bytes not matching to within a threshold.

In some examples, the first device may include a camera and the particular time increment may be a first time increment. In these examples, the instructions may be executable to determine whether the camera is currently providing data to the at least one processor and to determine whether a video conference application executing at the first device is currently providing data to the second device as part of the video conference. The instructions may then be executable to, responsive to determining that the camera is currently providing data to the at least one processor and that the video conference application is currently providing data to the second device as part of the video conference, determine a third number of bytes of data for a second time increment that are being transmitted from the first device to the second device as part of the video conference. Thereafter, the instructions may be executable to transmit, to the second device, an indication specifying the third number of bytes that are to be received by the second device during the second time increment.

In some implementations, the one or more actions may include transmitting metadata to the second device regarding the discrepancy between the first number of bytes and the second number of bytes. The transmission of the metadata to the second device regarding the discrepancy between the first number of bytes and the second number of bytes may include transmitting data specifying the first number of bytes.

Also in some implementations, the first device may include a display and the one or more actions may include presenting, on the display, information related to the quality of presentation of audio video data (AV) for the video conference at the first device. The information related to the quality of presentation of the AV data may include information indicating a number of bytes that were not received at the first device as expected based on the metadata and/or information indicating bytes received out of order from the second device.

Still further, in some implementations the one or more actions may include refreshing a network connection, repairing a network connection, downgrading to a lower quality audio video (AV) content presentation, and informing a third device of the discrepancy between the first number of bytes and the second number of bytes. The third device may be different from the first and second devices and, for example, the second device may be a server and the third device may be an end-user device.

If desired, in some examples the one or more actions may also include presenting one or more recommendations on a display accessible to the first device. The one or more recommendations may indicate one or more actions a user can take to improve presentation of the video conference at the first device.

In another aspect, a method includes comparing a first number of bytes sent from a first device as part of a video conference to a second number of bytes received at a second device as part of the video conference, where the first and second number of bytes both pertain to a same portion of the video conference. The method also includes, responsive to the first number of bytes not matching the second number of bytes to within a threshold, taking one or more actions to assist in mitigating future loss of bytes for the video conference. The method may be implemented by a server, the first device, and/or the second device.

In some examples, the one or more actions themselves may include refreshing a network connection used by one or more of the first device and the second device to participate in the video conference, and/or transmitting data between the first and second devices that indicates that the first number of bytes does not match the second number of bytes to within the threshold. Additionally or alternatively, the one or more actions may include downgrading a frame rate for presentation of images for the video conference at the second device, and/or downgrading a sample rate for presentation of audio for the video conference at the second device. Even further, if desired the one or more actions may include presenting one or more recommendations on an electronic display indicating one or more actions a user can take to mitigate byte loss, and/or presenting one or more recommendations on the electronic display to use another method of communication to participate in the video conference.

In still another aspect, at least one device includes at least one computer readable storage medium (CRSM) that is not a transitory signal. The computer readable storage medium includes instructions executable by at least one processor to determine whether a number of bytes sent from a first device during a video conference matches a second number of bytes received by a second device during the video conference to within a threshold, where the first number of bytes and the second number of bytes both pertain to the same portion of the video conference. The instructions are also executable to, responsive to a determination that the bytes sent from the first device during the video conference do not match a second number of bytes received by the second device during the video conference, take one or more actions to improve transmission of data related to the video conference.

In some examples, the at least one device may include a system of plural devices that includes the first device, the second device, and a server that is different from the first and second devices. The server may facilitate the conference between the first and second devices.

Additionally, in some implementations the at least one action may include presenting a graphical user interface (GUI) on a display accessible to the first device. The GUI may include both an indication of how many devices are to receive audio video (AV) data to participate in the video conference and an indication of how many devices are actually receiving AV data to participate in the video conference.

The details of present principles, both as to their structure and operation, can best be understood in reference to the accompanying drawings, in which like reference numerals refer to like parts, and in which:

BRIEF DESCRIPTION OF THE DRAWINGS

FIG. 6 shows an example GUI for configuring one or more settings related to video conferencing consistent with present principles.

DETAILED DESCRIPTION

Figure 1:
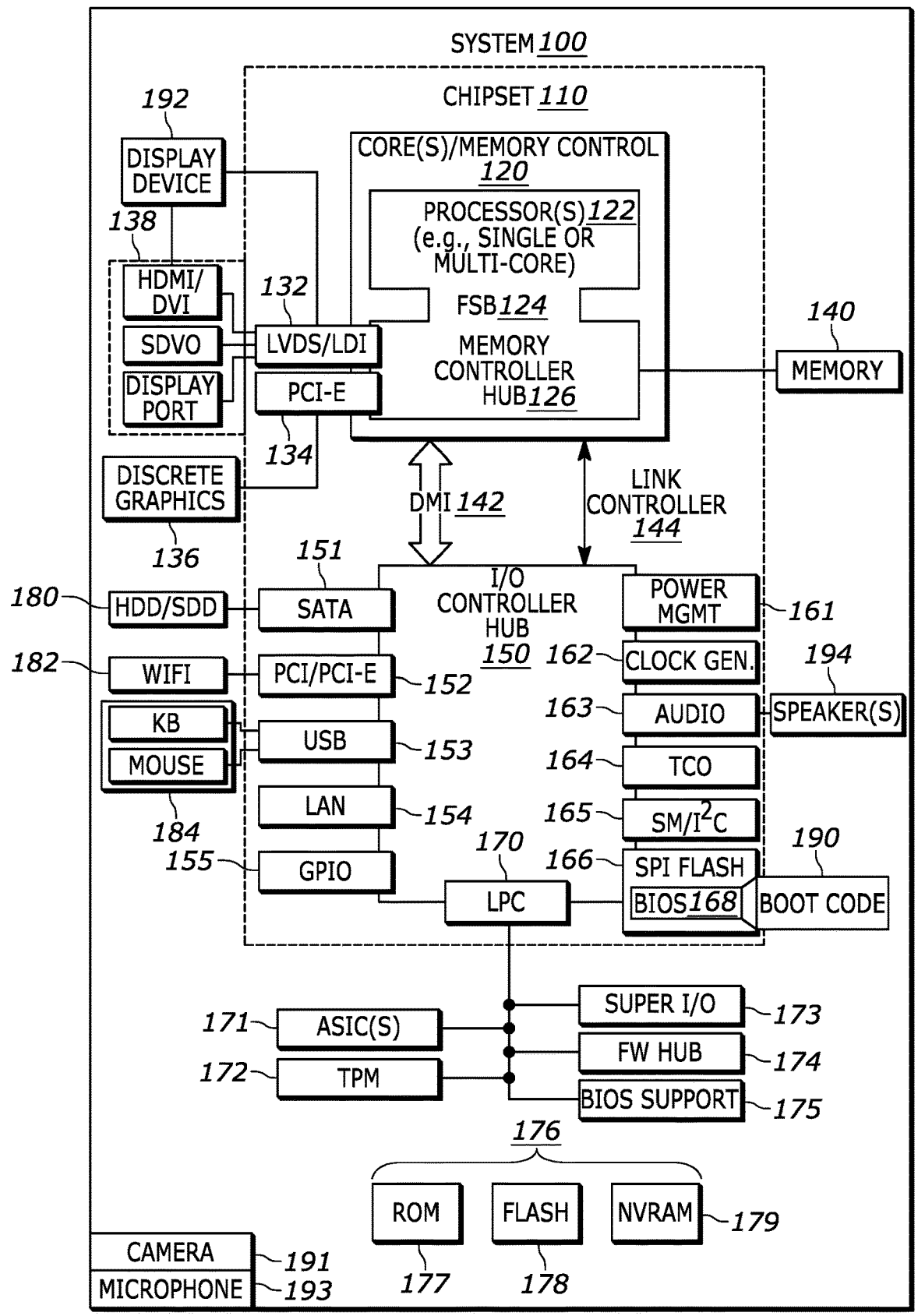
FIG. 1 is a block diagram of an example system consistent with present principles.

The present application discloses, among other things, use of video conference application metadata to determine the source/destination of conference broadcasts along with monitoring/analysis of byte flow from the presenter/broadcaster toward the peer/server and byte reception by the peer at the receiving end.

To do so, application-provided knowledge of what broadcasts are expected to be flowing at any given time may be used, as well as information on what peers are expected to be receiving these broadcasts. For example, this includes knowledge that one or more peers are actively broadcasting, identification of the broadcaster, the medium being used (screen/camera, etc.), and local device identification (Camera A on the broadcast machine vs. Camera B, etc.). This might also include knowledge that one or more peers are supposed to be actively receiving one or more of the existing broadcasts.

This application-provided knowledge may then be used to verify broadcast of the expected data. For example, the broadcaster machine may be analyzed to determine that the local input device (e.g., camera) is providing input bytes. Additionally, the broadcaster conferencing application (native application, web browser, etc.) may be analyzed to determine that bytes/network packets are actively outbound as expected and headed toward a peer or server. Still further, in instances where conferencing servers or middleware applications are utilized, the server/application where the broadcast is directed may be analyzed to ensure that bytes/network packets are actively received from the broadcasting peer.

The application-provided knowledge, and the knowledge that the broadcast itself is successful, may then be used to verify reception of the expected data by the peer device. For example, a receiving peer device may be analyzed to determine that the bytes/network packets are being received on an active connection from the server/middleware/broadcasting peer.

This information can then be used to provide certain behavior in video conferencing implementations. For example, a broadcasting device may present an analysis of statistical information informing the broadcaster of the quality of their broadcast (e.g., how many bytes/packets are being dropped, how jitter is adversely affecting quality, etc.). Similar stats may also be made available to the viewer of the broadcast to indicate the quality of their data reception. As another example, a broadcasting device may present statistical information informing a broadcaster of how many peers are expected to receive their broadcast and how many peers are actively receiving their broadcast at any given time.

In certain situations, the broadcasting device or receiving device may then perform intelligent self-correction of the broadcast/reception issues. This may include refreshing or repairing idle/poor connections by e.g. refreshing an internet protocol (IP) address for the device, performing reception stream downgrades, informing the peer of issues and providing a list of manual mitigation steps such as alternative connection options the user may try.

Note that a byte itself may be a unit digital information often indicating a single character. In many examples, a byte may have a size of eight bits, though in other examples the size may be different (e.g., one to forty eight bits).

Prior to delving further into the details of the instant techniques, note with respect to any computer systems discussed herein that a system may include server and client components, connected over a network such that data may be exchanged between the client and server components. The client components may include one or more computing devices including televisions (e.g., smart TVs, Internet-enabled TVs), computers such as desktops, laptops and tablet computers, so-called convertible devices (e.g., having a tablet configuration and laptop configuration), and other mobile devices including smart phones. These client devices may employ, as non-limiting examples, operating systems from Apple Inc. of Cupertino Calif., Google Inc. of Mountain View, Calif., or Microsoft Corp. of Redmond, Wash. A Unix® or similar such as Linux® operating system may be used. These operating systems can execute one or more browsers such as a browser made by Microsoft or Google or Mozilla or another browser program that can access web pages and applications hosted by Internet servers over a network such as the Internet, a local intranet, or a virtual private network.

As used herein, instructions refer to computer-implemented steps for processing information in the system. Instructions can be implemented in software, firmware or hardware, or combinations thereof and include any type of programmed step undertaken by components of the system; hence, illustrative components, blocks, modules, circuits, and steps are sometimes set forth in terms of their functionality.

A processor may be any general purpose single- or multi-chip processor that can execute logic by means of various lines such as address lines, data lines, and control lines and registers and shift registers. Moreover, any logical blocks, modules, and circuits described herein can be implemented or performed with a general purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can also be implemented by a controller or state machine or a combination of computing devices. Thus, the methods herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may also be embodied in a non-transitory device that is being vended and/or provided that is not a transitory, propagating signal and/or a signal per se (such as a hard disk drive, CD ROM or Flash drive). The software code instructions may also be downloaded over the Internet. Accordingly, it is to be understood that although a software application for undertaking present principles may be vended with a device such as the system 100 described below, such an application may also be downloaded from a server to a device over a network such as the Internet.

Software modules and/or applications described by way of flow charts and/or user interfaces herein can include various sub-routines, procedures, etc. Without limiting the disclosure, logic stated to be executed by a particular module can be redistributed to other software modules and/or combined together in a single module and/or made available in a shareable library.

Logic when implemented in software, can be written in an appropriate language such as but not limited to C# or C++, and can be stored on or transmitted through a computer-readable storage medium (that is not a transitory, propagating signal per se) such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

The term "circuit" or "circuitry" may be used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Now specifically in reference to FIG. 1, an example block diagram of an information handling system and/or computer system 100 is shown that is understood to have a housing for the components described below. Note that in some embodiments the system 100 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a client device, a server or other machine in accordance with present principles may include other features or only some of the features of the system 100. Also, the system 100 may be, e.g., a game console such as XBOX®, and/or the system 100 may include a mobile communication device such as a mobile telephone, notebook computer, and/or other portable computerized device.

As shown in FIG. 1, the system 100 may include a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 can further include a low-voltage differential signaling interface (LVDS) 132. The LVDS 132 may be a so-called LVDS Display Interface (LDI) for support of a display device 192 (e.g., a CRT, a flat panel, a projector, a touch-enabled light emitting diode display or other video display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (x16) PCI-E port for an external PCI-E-based graphics card (including, e.g., one of more GPUs). An example system may include AGP or PCI-E for support of graphics.

In examples in which it is used, the I/O hub controller 150 can include a variety of interfaces. The example of FIG. 1 includes a SATA interface 151, one or more PCI-E interfaces 152 (optionally one or more legacy PCI interfaces), one or more USB interfaces 153, a LAN interface 154 (more generally a network interface for communication over at least one network such as the Internet, a WAN, a LAN, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes BIOS 168 and boot code 190. With respect to network connections, the I/O hub controller 150 may include integrated gigabit Ethernet controller lines multiplexed with a PCI-E interface port. Other network features may operate independent of a PCI-E interface.

The interfaces of the I/O hub controller 150 may provide for communication with various devices, networks, etc. For example, where used, the SATA interface 151 provides for reading, writing or reading and writing information on one or more drives 180 such as HDDs, SDDs or a combination thereof, but in any case the drives 180 are understood to be, e.g., tangible computer readable storage mediums that are not transitory, propagating signals. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

The system 100 may also include a camera 191 that gathers one or more images and provides input related thereto to the processor 122. The camera 191 may be a thermal imaging camera, an infrared (IR) camera, a digital camera such as a webcam, a three-dimensional (3D) camera, and/or a camera otherwise integrated into the system 100 and controllable by the processor 122 to gather pictures/images and/or video (e.g., a video stream of an end-user for video conferencing consistent with present principles). Additionally, the system 100 may include an audio receiver/microphone 193 that provides input from the microphone 193 to the processor 122 based on audio that is detected, such as via a user providing audible input to the microphone as part of a video conference consistent with present principles.

Still further, though not shown for simplicity in some embodiments the system 100 may include a gyroscope that senses and/or measures the orientation of the system 100 and provides input related thereto to the processor 122, as well as an accelerometer that senses acceleration and/or movement of the system 100 and provides input related thereto to the processor 122. Also, the system 100 may include a GPS transceiver that is configured to communicate with at least one satellite to receive/identify geographic position information and provide the geographic position information to the processor 122. However, it is to be understood that another suitable position receiver other than a GPS receiver may be used in accordance with present principles to determine the location of the system 100.

It is to be understood that an example client device or other machine/computer may include fewer or more features than shown on the system 100 of FIG. 1. In any case, it is to be understood at least based on the foregoing that the system 100 is configured to undertake present principles.

Figure 2:
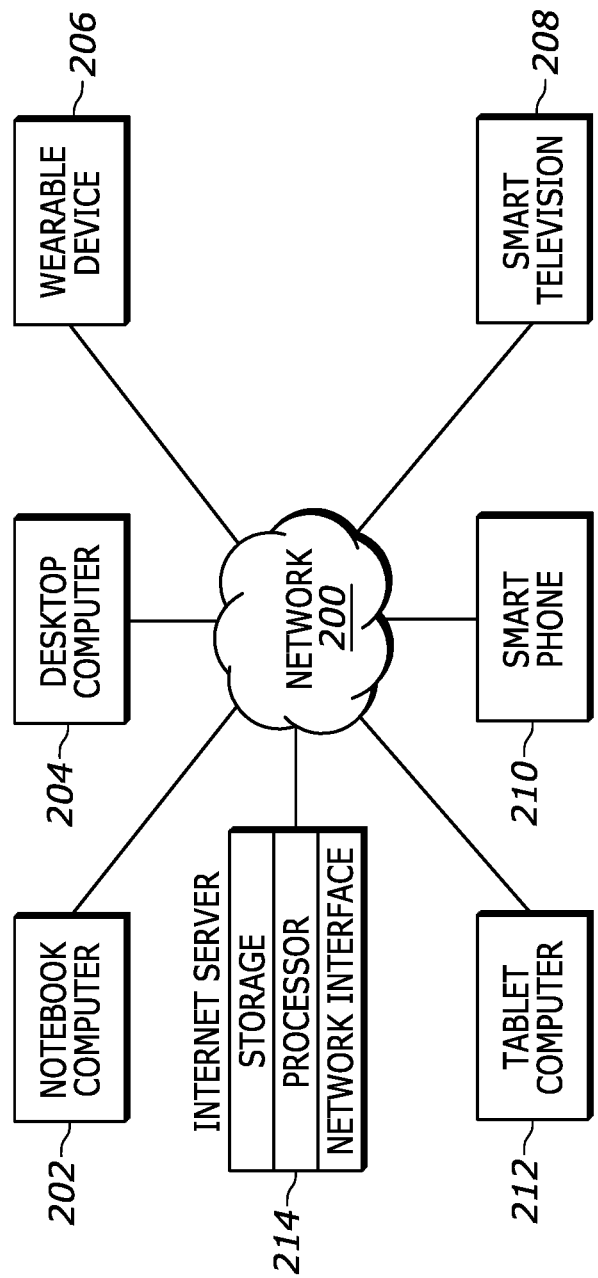
FIG. 2 is a block diagram of an example network of devices consistent with present principles.

Turning now to FIG. 2, example devices are shown communicating over a network 200 such as the Internet to engage in video conferencing consistent with present principles. It is to be understood that each of the devices described in reference to FIG. 2 may include at least some of the features, components, and/or elements of the system 100 described above. Indeed, any of the devices disclosed herein may include at least some of the features, components, and/or elements of the system 100 described above.

FIG. 2 shows a notebook computer and/or convertible computer 202, a desktop computer 204, a wearable device 206 such as a smart watch, a smart television (TV) 208, a smart phone 210, a tablet computer 212, and a server 214 such as an Internet server that may provide cloud storage accessible to the devices 202-212. It is to be understood that the devices 202-214 are configured to communicate with each other over the network 200 to undertake present principles.

For example, the devices 202-212 may communicate directly peer-to-peer with each other for video conferencing without video conferencing streams for their respective devices (video, audio, and metadata streams) being routed through an Internet server. Additionally or alternatively, the devices 202-212 may route video conferencing streams for their respective devices to each other through the server 214 in embodiments where the server 214 is facilitating communication amongst the devices 202-212 for video conferencing, merging video streams from various other devices 202-212 to provide them as one stream to another device 202-212, hosting the video conference as a video conferencing platform, etc.

Figure 3:
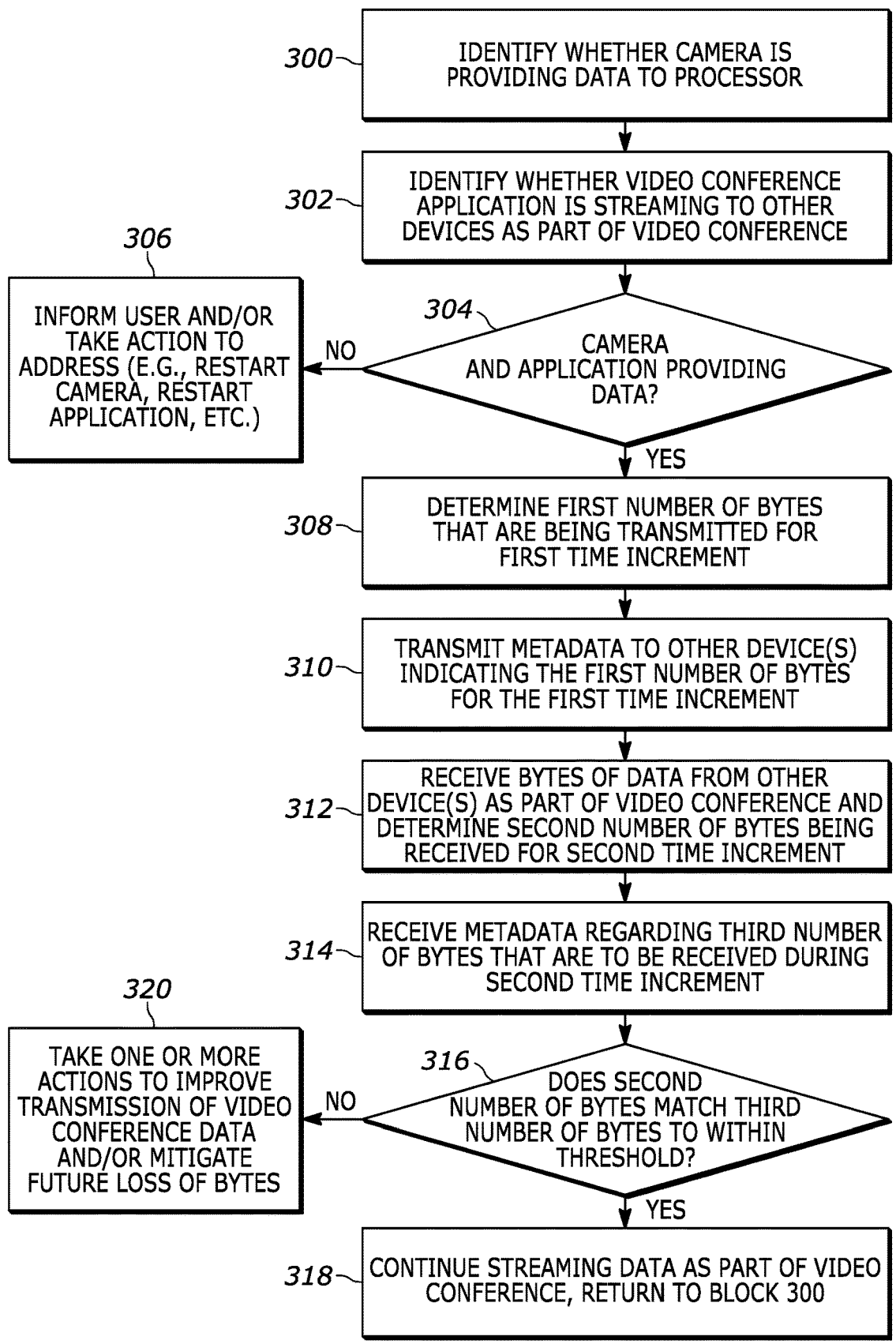
FIG. 3 is a flow chart of an example algorithm executable by a device during video conferencing consistent with present principles.

Referring to FIG. 3, it shows example logic that may be executed by a first device such as the system 100 consistent with present principles in order to engage in/facilitate a video conference with other devices. Beginning at block 300, the first device may identify whether its camera is currently providing image data to the first device's internal processor (e.g., central processing unit). This identification may be made by identifying the presence or absence of signals from the camera after commanding the camera to gather images/video, for example. From block 300 the logic may then proceed to block 302.

At block 302 the first device may identify whether a video conference application launched or executing at the first device to participate in the video conference is in fact streaming audio data from the first device's microphone and video data from the first device's camera outbound to other devices. For example, the first device may monitor its port(s) or Wi-Fi transceiver to make the identification at block 302, may monitor data as provided from the application to the port or transceiver, etc. From block 302 the logic may then proceed to decision diamond 304.

At diamond 304 the device may determine based on the identifications at blocks 300 and 302 whether its camera and video conferencing application are in fact providing data to the first device's processor and other devices, respectively. A negative determination at diamond 304 may cause the logic to proceed to block 306.

At block 306 the device may inform the user that either the camera is not providing video data/images to the first device's internal processor and/or that the video conferencing application is not providing audio and video data outbound to other devices participating in the video conference. Additionally or alternatively, at block 306 the device may inform the user of actions the first device is taking at block 306 or the end-user himself or herself might take to address the issue. For example, the user may be instructed to restart the first device, connect to a different Wi-Fi network, switch from a Wi-Fi network to a wired ethernet local area network (LAN), etc. Actions the first device might itself take without user action at block 306 include restarting a camera driver or firmware being used to control the camera or restarting the camera itself if the issue is with the camera not providing data to the first device's processor. The first device's actions may also include closing and restarting/relaunching the video conferencing application itself if the issue is with the application not providing data outbound to other devices. Additional actions that may be taken by the first device itself without user command might also include refreshing or repairing a network connection being used to stream the video conference data to other devices, switching from using a Wi-Fi network to an already-connected wired ethernet LAN as the first device's active network connection, etc.

In terms of how specifically the device might inform the user of the action(s) the first device is taking or that the end-user himself or herself might take to address the issue, these notifications may be presented as part of a graphical user interface (GUI) presented on the first device's display. Additionally or alternatively, the notifications may be presented audibly over a speaker accessible to the first device, such as a speaker disposed on the first device or a speaker disposed on a speaker/microphone headset that communicates with the first device and is being used by the user for hearing and speaking as part of the video conference.

After block 306, the logic may revert back to block 300 and proceed therefrom. Referring back to diamond 304, however, note that an affirmative determination may instead result in the logic proceeding to block 308 rather than block 306.

At block 308, the first device may determine a first number of bytes (or network packets) that are being transmitted during a first time increment to other devices participating in the video conference. The time increment itself may be a time range between two distinct times, such as between 9:01 a.m. and 9:02 a.m., or even a finer time increment of mere seconds (or milliseconds), such as between 9:01:01 a.m. and 9:01:10 a.m. The determination of the first number of bytes itself may be performed by monitoring outbound network traffic from the first device, or even outbound network traffic directed specifically by the video conferencing application itself, during the first time increment.

From block 308 the logic may then proceed to block 310. At block 310 the first device may transmit metadata to the other devices participating in the video conference. The metadata may indicate, among other things, the first number of bytes during the first time increment, the first time increment itself, and the order in which the bytes are to be received during the first time increment so that the other devices may know based on the metadata how many bytes to expect to receive and in what order during the first time increment. The metadata may also include other indications as well, such as an indication that the first device is actively transmitting data as part of the video conference in the first place, identification numbers for the first device (e.g., internet protocol (IP) address and/or media access control (MAC) address), the item or medium being shared (e.g., sharing a display screen, camera feed, microphone feed, etc.), an identifier of the end-user that is using the first device to participate in the video conference, and even identifiers for which individual components of the first device are being used to participate in the video conference (e.g., which of two cameras disposed on the first device is being actively used for streaming video showing the end-user).

From block 310 the logic may then proceed to block 312. At block 312 the first device may receive bytes of data from other devices that are participating in the video conference. Also at block 312, the first device may determine, based on the received bytes, a second number of bytes that are being received during a second time increment by monitoring incoming network traffic and/or network traffic directed to the video conference application specifically. The second time increment may be or encompass the same or a different time span as the first time increment.

After block 312, the logic may then proceed to block 314. At block 314 the first device may receive metadata indicating a third number of bytes that are to be received during the second time increment and in what order those bytes are to be received. The metadata may also indicate other items as well, including those mentioned above with respect block 310 regarding the metadata transmitted by the first device to the other devices. In essence, at blocks 310 and 314 the first device and other devices may exchange metadata regarding their respective outbound traffic and other items listed above as part of the video conference.

From block 314 the logic may then proceed to decision diamond 316. At diamond 316 the first device may determine whether the second number of bytes determined at block 312 matches the third number of bytes indicated in the metadata received at block 314, at least to within a threshold. The threshold may pertain to an acceptable level of byte loss for which successful or uninterrupted video conference communication is still considered to be achieved. Thus, the threshold may be a threshold number of expected bytes that are lost or otherwise not received. The threshold may be established by the video conference application's developer, the manufacturer of the first device, a server managing the video conference, or another entity. Also at diamond 316, in some examples the first device may compare the order in which the bytes were to be received as indicated in the metadata received at block 314 to the order in which they were actually received at block 312 to determine if any jitter/bytes being received out of order is occurring.

An affirmative determination at diamond 316 may cause the logic to proceed to block 318. At block 318 the first device may continue streaming data to and from the other devices as part of the video conference and, if desired, return to block 300 to proceed therefrom. However, a negative determination at diamond 316 may instead cause the logic to proceed to block 320.

At block 320 the first device may itself, without user command, take one or more actions to improve transmission of video conference data and/or to take other actions to otherwise mitigate future byte loss. For example, at block 320 the first device may restart a network transceiver driver or firmware being used to receive the AV content stream of the video conference, or restarting the first device's network transceiver itself. At block 320 the first device may also close and restart/relaunch the video conferencing application itself. The first device might also refresh or repair a network connection being used to stream the video conference data at block 320, or switch from using a Wi-Fi network to a wired ethernet LAN as the first device's active network connection, etc.

Additionally, at block 320 the first device might perform a reception stream downgrade where the first device may downgrade from streaming video of other participants (or streaming screen sharing from one of the other participants) at a first image quality, refresh rate, and/or resolution to a second and lesser image quality, refresh rate, and/or resolution. The reception stream downgrade may also include streaming conference audio at a lesser audio sampling rate than prior to the downgrade.

Still further, at block 320 the first device may electronically inform the devices of the other video conference participants of the byte loss, and/or present the end-user of the first device with an indication of byte loss along with a list of one or more manual steps the user might take to mitigate byte loss. For example, the user may be instructed to restart the first device, connect to a different Wi-Fi network, switch from a Wi-Fi network to a wired ethernet local area network (LAN), etc. Even further, at block 320 the device may present information to the user regarding the byte loss itself, such as the number of bytes lost, whether the byte loss pertains to audio or video data, and what actions the first device itself is taking to reduce byte loss.

Before moving on in the detailed description to other figures, it is to be understood consistent with present principles that some or all of the logic of FIG. 3 may be executed by a server facilitating the video conference among plural end-user devices. Thus, for example, while the server might not identify whether a camera disposed on it is providing data to its processor at block 300 unless a video conference participant happens to be using the server for video streaming, it may identify whether its application is streaming AV data to other devices as expected as part of the video conference at diamond 304. The server may also verify whether it is receiving a number of bytes it is supposed to receive from one of the end-user devices during a particular time increment at diamond 316 to then take appropriate action at block 320, such as refreshing or repairing a network connection to that end-user device or restarting software executing at the server to facilitate the video conference. The server might also use a different network, network connection, and/or port at block 320, as well as downgrade audio and video streams being received at the server from one end-user device and/or transmitted to other end-user devices.

Additionally, the server may take other actions at block 320, such as remotely-controlling an end-user device through network commands to take one or more of the actions described above in reference to blocks 306 and/or 320 at the end-user device itself. This may include issuing commands for the end-user device to repair or refresh its network connection at the end-user device itself, restarting a copy of the video conference application executing at the end-user device, restarting device firmware at the end-user device, controlling the end-user device's display to present information as disclosed above and to provide a list of manual steps the end-user himself or herself might take at the end-user device to mitigate byte loss, etc.

Figure 4:
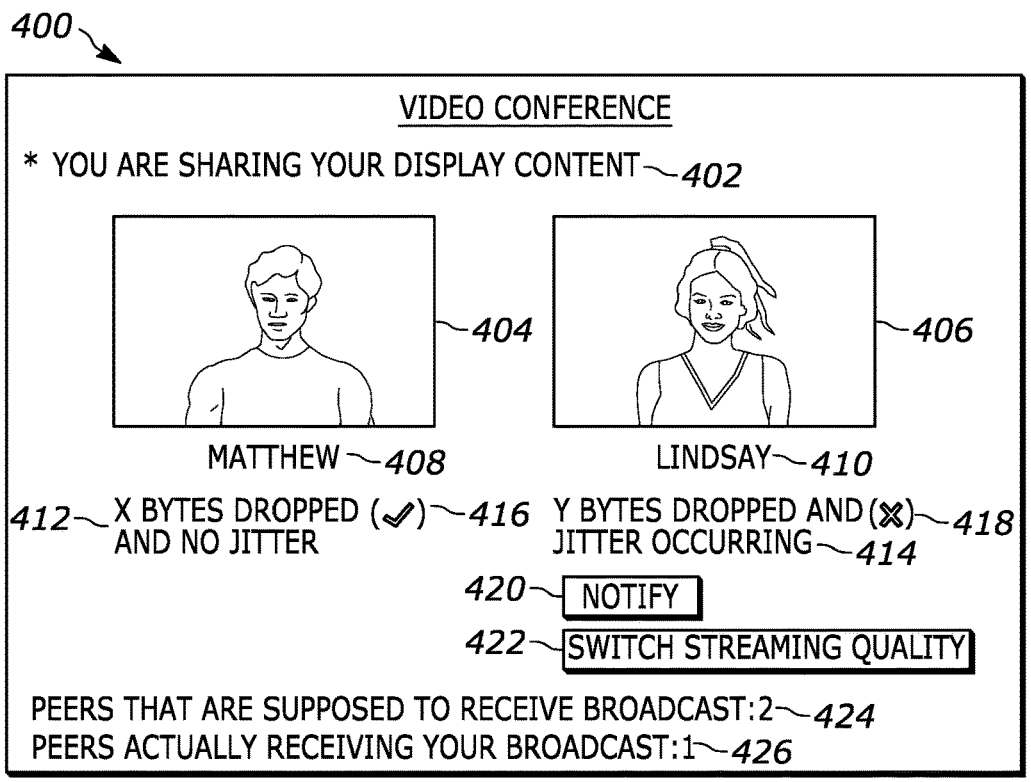
FIGS. 4 and 5 show example graphical user interfaces (GUIs) that may be presented on the display of a device during video conferencing consistent with present principles.

Continuing now in reference to FIG. 4, it shows an example graphical user interface (GUI) 400 that may be presented on the display of an end-user's device during video conferencing consistent with present principles. It is to be understood that in this example the end user herself is a conferee named Sarah.

As shown, the GUI 400 may include a text indication 402 that Sarah's device is sharing content presented on her device's display with other participant devices of the video conference (in addition to sharing a camera feed showing Sarah's face and a microphone feed of Sarah speaking). Additionally, while audio of other remote conference participants may be presented at Sarah's device via a speaker on the device, respective video streams 404, 406 of the other conference participants may also be presented as part of the GUI 400. Names 408, 410 below each respective stream 404, 406 indicate the name of the participant shown in the respective stream.

Additionally, statistics 412, 414 may also be presented beneath the video stream for each participant. As shown, the statistics may indicate, for each respective remote participant shown on the GUI 400, a number of bytes lost/dropped during transmission of that participant's audio and/or video streaming to Sarah's device as well as whether any jitter was detected (e.g., bytes received out of order). Still further, the GUI 400 may present, for each respective remote participant, a non-text icon or other graphical object 416, 418 in parentheses to indicate whether an expected number of bytes to be received from the respective participant matches an actual number of bytes received from the respective participant as disclosed herein. In this case, a successful match may be indicated by a check mark 416 presented in green coloring to denote success while an unsuccessful match may be indicated by an "X" 418 in red coloring to denote lack of success.

Still further, for remote participants for which byte loss has occurred (only Lindsay in this case), a selector 420 may be presented and selected by Sarah using touch or cursor input to command Sarah's device to transmit an electronic notification to Lindsay's device to inform Lindsay through her device that byte loss is occurring for the portion of the video conference AV stream transmitted by her device. A selector 422 may also be presented on the GUI that is selectable to downgrade to a lower quality AV content received at Sarah's device from Lindsay's device and/or transmitted from Lindsay's device itself. Downgrading may include going from a high definition (HD) video stream to a standard definition (SD) video stream, going from a relatively higher frame rate to a relatively lower frame rate for video streaming, lowering a sampling rate for audio of Lindsay that is being presented at Sarah's device, etc.

The GUI 400 may also include information 424 indicating a number of other conference participants that are supposed to be receiving Sarah's broadcast of AV data as part of the video conference (two in this example), as well as information 426 indicating a number of other conference participants that are actually receiving Sarah's broadcast as identified based on determined byte loss as described herein (one in this example owing to Lindsay's connectivity issues).

Figure 5:
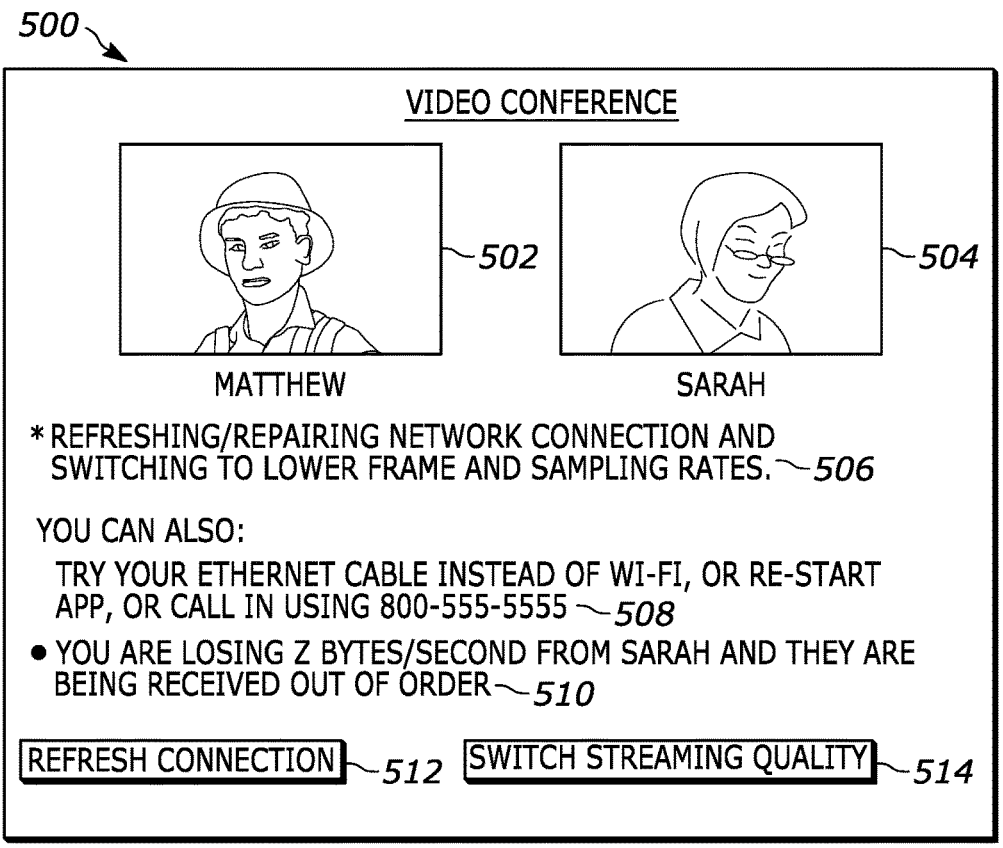

Moving on to FIG. 5, it shows another GUI 500 consistent with present principles. Continuing with the example of FIG. 4 from above, the GUI 500 may be presented on the display of Lindsay's device during the same video conference. Thus, the GUI 500 also shows a video stream 502 of Matthew, as well as a video stream 504 of Sarah. Note that although not shown for simplicity, indications similar to the indications 412-418 disclosed above for each remote participant may be determined and presented on the GUI 500 based on whatever conditions Lindsay's device determines at a given time during the video conference.

As also shown in FIG. 5, responsive to determining that byte loss is occurring in the transmission of AV data to/from Lindsay's device, an indication 506 may be presented. The indication 506 may indicate one or more actions that Lindsay's device is taking to mitigate byte loss consistent with present principles, which in this example includes refreshing or repairing a network connection that Lindsay's device is using. The indication 506 may also indicate that Lindsay's device is switching to a lower frame rate for the video stream of Lindsay that is being transmitted to the other remote participants as well as switching to a lower sampling rate for the audio stream for Lindsay that is being transmitted to the other remote participants.

The GUI 500 may also include one or more indications 508 of one or more actions that Lindsay might take herself to help remedy byte loss. In this example, the indications 508 include instructions for Lindsay to plug an active ethernet cable into her device to use a wired LAN rather than using the Wi-Fi network that is currently being used by Lindsay's device to participate in the video conference. The instructions may also include a recommendation to restart the video conferencing application executing at Lindsay's device to participate in the video conference, as well as potentially using one or more other methods of communication to participate. For example, other methods of communication might include calling in to the video conference via a certain call-in phone number over a cellular network or telephone landline as well as engaging in text chatting/instant messaging to communicate with other conference participants.

As also shown in FIG. 5, the GUI 500 may include an indication 510 of a number of bytes transmitted to Lindsay's device from Sarah's device that are being lost somewhere along the network path to Lindsay's device. The indication 510 may also indicate that some bytes are being received out of order in situations where Lindsay's device determines that this is occurring.

If desired, the GUI 500 may further include selectors 512, 514. The selector 512 may be selectable to refresh/restart Lindsay's network connection and/or to transmit an electronic request to Sarah's device that she refresh/restart her device's network connection. The selector 514 may be selectable to automatically switch AV content streaming to or from Lindsay's device to a lower image and/or sound quality, and/or to transmit an electronic request to Sarah's device (or coordinating server) that her device (or the server) reduce the image and/or sound quality of video and audio that is being transmitted to Lindsay's device as part of the video conference.

Consistent with the example of FIGS. 4 and 5 above, note that as either of Sarah's or Lindsay's devices detect changes in byte loss or successful transmissions, the GUIs 400 and 500 may dynamically update with any of the features above as appropriate to correspond to the current conditions.

Now describing FIG. 6, it shows an example GUI 600 that may be presented on the display of a device configured to undertake present principles, such as Lindsay's or Sarah's device according to the example above. The GUI 600 may be used to configure one or more settings for video conferencing as disclosed herein.

As shown in FIG. 6, a first option 602 may be presented on the GUI 600 and be selectable by directing input to the adjacent check box in order to configure the device to undertake present principles. For example, selection of the option 602 may set or configure the device to execute the logic of FIG. 3 and to present either of the GUIs 400 and 500 as appropriate. The GUI 600 may also include a sub-option 604 that may be selected via the adjacent check box to configure the device to take actions to remedy byte loss without user command to do so, as well as a sub-option 606 that may be selected via the adjacent check box to configure the device to instruct the user of manual actions that the user might take to remedy byte loss. Additionally, though not shown for simplicity, the GUI 600 may include one or more additional sub-options listing various particular actions that may be selected for the device to take without user command to remedy byte loss as disclosed herein, such as refreshing a network connection or relaunching a video conferencing application.

It may now be appreciated that present principles provide for an improved computer-based user interface that improves the functionality and ease of use of the devices disclosed herein while the devices communicate over a computer network for video conferencing. The disclosed concepts are rooted in computer technology for computers to carry out their functions.

It is to be understood that whilst present principals have been described with reference to some example embodiments, these are not intended to be limiting, and that various alternative arrangements may be used to implement the subject matter claimed herein. Components included in one embodiment can be used in other embodiments in any appropriate combination. For example, any of the various components described herein and/or depicted in the Figures may be combined, interchanged or excluded from other embodiments.

What is claimed is:

1. A first device, comprising:
   at least one processor;
   a camera; and
   storage accessible to the at least one processor and comprising instructions executable by the at least one processor to:
   receive one or more bytes of data from a second device as part of a video conference;
   determine, based on the one or more bytes of data from the second device, a first number of bytes being received during a first time increment;
   receive metadata regarding a second number of bytes that are to be received during the first time increment;
   compare the first number of bytes to the second number of bytes;
   responsive to the first number of bytes and the second number of bytes not matching to within a threshold, take one or more actions to facilitate the video conference;
   determine whether the camera is currently providing data to the at least one processor;

determine whether a video conference application executing at the first device is currently providing data to the second device as part of the video conference;

responsive to determining that the camera is currently providing data to the at least one processor and that the video conference application is currently providing data to the second device as part of the video conference, determine a third number of bytes of data for a second time increment that are being transmitted from the first device to the second device as part of the video conference; and transmit, to the second device, an indication specifying the third number of bytes that are to be received by the second device during the second time increment.

2. The first device of claim 1, wherein the one or more actions comprise transmitting metadata to the second device regarding the discrepancy between the first number of bytes and the second number of bytes.

3. The first device of claim 2, wherein the transmission of the metadata to the second device regarding the discrepancy between the first number of bytes and the second number of bytes comprises transmitting data specifying the first number of bytes.

4. The first device of claim 1, comprising a display, wherein the one or more actions comprise presenting, on the display, information related to the quality of presentation of audio video data (AV) for the video conference at the first device, wherein the information related to the quality of presentation of the AV data comprises information indicating a number of bytes that were not received at the first device as expected based on the metadata.

5. The first device of claim 1, comprising a display, wherein the one or more actions comprise presenting, on the display, information related to the quality of presentation of audio video data (AV) for the video conference at the first device, wherein the information related to the quality of presentation of the AV data comprises information indicating bytes received out of order from the second device.

6. The first device of claim 1, wherein the one or more actions comprise: refreshing a network connection with a third device, repairing a network connection with the third device, wherein the third device is different from the first and second devices.

7. The first device of claim 6, wherein the second device is a server and wherein the third device is an end-user device.

8. The first device of claim 1, wherein the one or more actions comprise presenting one or more recommendations on a display accessible to the first device, the one or more recommendations indicating one or more actions a user can take to improve presentation of the video conference at the first device.

9. A method, comprising:
comparing a first number of bytes sent from a first device as part of a video conference to a second number of bytes received at a second device as part of the video conference, the first and second number of bytes both pertaining to a same portion of the video conference; and responsive to the first number of bytes not matching the second number of bytes to within a threshold, taking one or more actions, wherein the one or more actions comprise transmitting metadata to the first device regarding the discrepancy between the first number of bytes and the second number of bytes, and wherein the transmission of the metadata to the first device regarding the discrepancy between the first number of bytes and the second number of bytes comprises transmitting data specifying the second number of bytes.

10. The method of claim 9, wherein the method is implemented by a server.

11. The method of claim 9, wherein the method is implemented by one or more of the first device and the second device.

12. The method of claim 9, wherein the one or more actions comprise refreshing a network connection used by one or more of the first device and the second device to participate in the video conference.

13. The method of claim 9, wherein the one or more actions comprise: presenting one or more recommendations on an electronic display indicating one or more actions a user can take to mitigate byte loss, and/or presenting one or more recommendations on the electronic display to use another method of communication to participate in the video conference.

14. At least one device, comprising:
at least one computer readable storage medium (CRSM) that is not a transitory signal, the computer readable storage medium comprising instructions executable by at least one processor to:

determine whether a first number of bytes sent from a first device during a video conference matches a second number of bytes received by a second device during the video conference to within a threshold, the first number of bytes and the second number of bytes both pertaining to the same portion of the video conference; and responsive to a determination that the first number of bytes sent from the first device during the video conference does not match the second number of bytes received by the second device during the video conference, take one or more actions, wherein the one or more actions comprise presenting, on a display, information related to the quality of presentation at the second device of audio video data (AV) for the video conference, and wherein the information related to the quality of presentation of the AV data comprises information indicating a third number of bytes that were not received at the second device as expected.

15. The at least one device of claim 14, comprising a system of plural devices, the system of plural devices comprising the first device, the second device, and a server that is different from the first and second devices, the server facilitating the conference between the first and second devices.

16. The at least one device of claim 14, wherein the at least one action comprises:
presenting a graphical user interface (GUI) on a display of one or more of the first and second devices, the GUI comprising both an indication of how many devices are to receive data to participate in the video conference and an indication of how many devices are actually receiving data to participate in the video conference.

17. The at least one device of claim 14, wherein the instructions are executable to:
determine whether a camera is currently providing data to a processor of the second device;
determine whether a video conference application executing at the second device is currently providing data to the first device as part of the video conference;
responsive to determining that the camera is currently providing data to the processor of the second device and that the video conference application is currently providing data to the first device as part of the video conference, determine a fourth number of bytes of data for a particular time increment that are being transmitted from the second device to the first device as part of the video conference; and transmit, to the first device, an indication of the fourth number of bytes.

18. The at least one device of claim 14, wherein the one or more actions comprise transmitting metadata to the first device regarding the discrepancy between the first number of bytes and the second number of bytes, and wherein the transmission of the metadata to the first device regarding the discrepancy between the first number of bytes and the second number of bytes comprises transmitting data specifying the second number of bytes.

19. The method of claim 9, wherein the one or more actions comprise presenting, on a display, information related to the quality of presentation at the second device of audio video data (AV) for the video conference, and wherein the information related to the quality of presentation of the AV data comprises information indicating a third number of bytes that were not received at the second device.

20. The method of claim 9, comprising:

determining whether a camera is currently providing data to a processor of the second device;

determining whether a video conference application executing at the second device is currently providing data to the first device as part of the video conference;

responsive to determining that the camera is currently providing data to the processor of the second device and that the video conference application is currently providing data to the first device as part of the video conference, determining a third number of bytes of data for a particular time increment that are being transmitted from the second device to the first device as part of the video conference; and transmit, to the first device, an indication of the third number of bytes.

\* \* \* \* \*